(No Model.)

E. R. WHITNEY.
WIND WHEEL.

No. 552,164. Patented Dec. 31, 1895.

Witnesses
Jas. J. Maloney.
H. J. Livermore.

Inventor.
Edwin R. Whitney.
by Jos. P. Livermore
Att'y.

UNITED STATES PATENT OFFICE.

EDWIN R. WHITNEY, OF MANCHESTER, NEW HAMPSHIRE.

WIND-WHEEL.

SPECIFICATION forming part of Letters Patent No. 552,164, dated December 31, 1895.

Application filed April 4, 1895. Serial No. 544,422. (No model.)

*To all whom it may concern:*

Be it known that I, EDWIN R. WHITNEY, of Manchester, county of Hillsborough, State of New Hampshire, have invented an Improvement in Wind-Wheels, of which the following description, in connection with the accompanying drawings, is a specification, like letters on the drawings representing like parts.

This invention relates to a wind-wheel of that kind in which the plane of rotation of the wheel is substantially at right angles to the direction of movement of the wind, or in other words the axis of the wheel is in line with the direction of movement of the propelling air-current.

The wheel forming the subject of this invention comprises a central deflecting portion which changes the direction of movement of the air impinging upon it without producing an impelling effect on the wheel, the said deflector being so constructed as to turn the wind striking upon it from the movement in line with the axis to a movement substantially radially outward from the axis in all directions. Beyond the periphery of the deflecting portion the wheel is provided with propelling-blades, the planes of which are parallel with the axis of rotation but tangential to circles concentric therewith and therefore inclined to the outwardly-deflected air-currents, which thus react on the said blades with a tendency to rotate the wheel. The space between the base or periphery of the deflecting portion, which is of conical shape, and the blades is closed, as herein shown, by a plane surface, the result being that the air flowing radially outward from the axis is all brought to bear upon the propelling-blades to effectively actuate the wheel.

Figure 1:
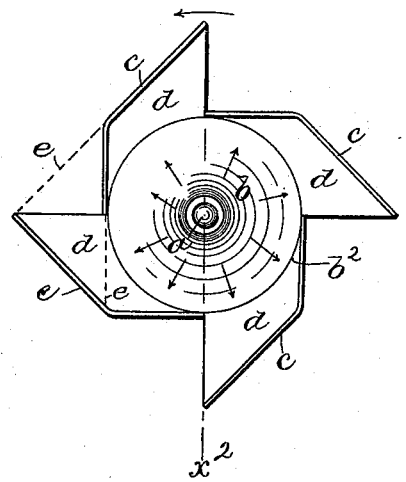
Figure 2:
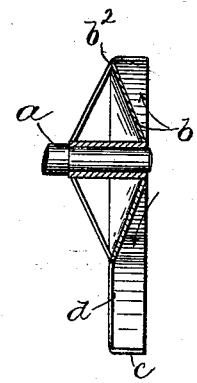

Figure 1 is a front elevation of a wind-wheel embodying this invention, showing the face upon which the wind impinges when the wheel is in operation; and Fig. 2, a transverse section thereof on line $x^2$, Fig. 1.

The wheel is mounted on a shaft $a$ to rotate on a horizontal axis in line with the direction of the air-current, and said wheel comprises a central deflecting portion $b$, shown as conical in shape, coaxial with the shaft $a$ and having its apex toward the face of the wheel against which the wind is directed. The air-current striking upon the rearwardly and outwardly inclined surface of the deflector $b$ is thus directed radially outward in all directions, as indicated by the small arrows thereon, Fig. 1, and by the arrows in Fig. 2.

Around the base of the deflector $b$ the wheel is provided with a number of propelling-blades $c$, the planes of which are substantially parallel to the axis of the wheel, as clearly shown in Fig. 2, but are inclined to radial lines therefrom. As herein shown the said blades extend for a portion of their length in a direction tangential to a circle $b^2$ concentric with the axis and then turn so as to extend in a direction tangential to a larger circle to their outer extremities, which are preferably each in the same radial line with the inner extremity of the next blade, as shown in Fig. 1. The propelling-blades $c$ are herein shown as four in number, each beginning at a point on the circumference of the circle $b^2$ and extending one-fourth way around the axis to a point on a circle of about double the diameter. As shown in this instance, the circle or inclined surface of the deflector terminates at the circle through the inner ends of the blades and the space between said circle and the rear edge of each blade is occupied by a plane surface $d$, so that the air striking on the deflector and being deflected radially outward from the axis thereof is all caused to impinge upon the blades $c$, which are inclined to the radially outwardly-moving air, as clearly shown in Fig. 1, and are thus effectively acted upon thereby to produce rotation of the wheel in the direction of the arrow $r$, Fig. 1.

The blades may be strengthened or reinforced by braces if need be, light wires or tie-rods, as indicated at $e$, Fig. 1, extending from each extremity of the front edge of each blade to an intermediate point on the next being found very efficient for this purpose.

It is obvious that the details of construction and proportions—such, for example, as inclination of the deflector, the number of blades and angle of said blades—may be varied without departing from the essential feature of the invention.

I claim—

1. A wind wheel comprising a central deflector having its surface inclined rearwardly and outwardly to divert the air-currents radially from the axis of the wheel, and a series of independent propelling blades, each composed of a portion springing from the periphery of the deflector and flaring outwardly therefrom in one direction and projecting over the deflector in another direction, substantially as described.

2. In a wind wheel the combination of the central rearwardly and outwardly inclined deflector, with blades substantially parallel with the axis and having portions tangential to a number of circles concentric with the axis of the wheel substantially as and for the purpose described.

3. A wind wheel comprising essentially a rearwardly and outwardly inclined coaxial deflector against which the air-currents impinge and by which they are diverted radially from the axis, and blades projecting outwardly from the axis of rotation and next the deflector and lying in planes to intercept the diverted air currents and thereby propel the wheel, the said blades having their intercepting portions bent or turned from the line of initial projection, substantially as described.

4. In a wind wheel, the combination with a central deflector coaxial with the wheel and inclined rearward and outward from the axis to divert the wind radially outward from the axis in all directions, of propelling blades on the periphery of the wheel extending around the base of said deflector and having their propelling surfaces gradually increasing in distance from the axis in the direction of their length around the axis, substantially as described.

5. A wind wheel comprising a central deflector having its surface inclined rearwardly and outwardly to divert the air-currents radially from the axis of the wheel, and propelling blades projecting forwardly over the deflector, the wheel being closed between the base of the deflector and the rear edges of the blades, substantially as described.

In testimony whereof I have signed my name to this specification in the presence of two subscribing witnesses.

EDWIN R. WHITNEY.

Witnesses:
JOS. P. LIVERMORE,
JAS. J. MALONEY.